(12) United States Patent
Jonas et al.

(10) Patent No.: US 10,449,838 B2
(45) Date of Patent: Oct. 22, 2019

(54) SHADING DEVICE FOR A WINDOW PANE OF AN AUTOMOTIVE VEHICLE

(71) Applicants: Bernd Jonas, Rohrau (DE); Dietmar Elleder, Korntal-Muenchingen (DE); Adrian Bucur, Esslingen (DE); Timo Marzinke, Stuttgart (DE)

(72) Inventors: Bernd Jonas, Rohrau (DE); Dietmar Elleder, Korntal-Muenchingen (DE); Adrian Bucur, Esslingen (DE); Timo Marzinke, Stuttgart (DE)

(73) Assignee: BOS GMBH & CO. KG, Ostfildern (DE)

( * ) Notice: Subject to any disclaimer, the term of this patent is extended or adjusted under 35 U.S.C. 154(b) by 214 days.

(21) Appl. No.: 15/638,674

(22) Filed: Jun. 30, 2017

(65) Prior Publication Data
US 2018/0001747 A1    Jan. 4, 2018

(30) Foreign Application Priority Data
Jul. 4, 2016    (DE) .................. 10 2016 212 166

(51) Int. Cl.
*B60J 1/20*        (2006.01)

(52) U.S. Cl.
CPC ........... *B60J 1/2038* (2013.01); *B60J 1/2025* (2013.01); *B60J 1/2086* (2013.01)

(58) Field of Classification Search
CPC . B60J 1/20; B60J 1/2038; B60J 1/2025; B60J 1/2086; B60J 1/2072; B60J 1/2075;
(Continued)

(56) References Cited

U.S. PATENT DOCUMENTS 3,007,342 A * 11/1961 Russell .................. E06B 9/68
                                      160/133
4,997,022 A * 3/1991 Klein ..................... E06B 9/62
                                      160/265
(Continued)

FOREIGN PATENT DOCUMENTS

DE    20 2007 015 602 U1    3/2008
DE    10 2013 006 761 A1    4/2014
(Continued)

OTHER PUBLICATIONS

Search Report of German Patent Office issued in Application No. 10 2016 212 166.9 dated May 15, 2017 (5 pages).
(Continued)

*Primary Examiner* — Beth A Stephan
(74) *Attorney, Agent, or Firm* — Flynn Thiel, P.C.

(57) ABSTRACT

Shading device for a window pane of an automotive vehicle including a flexible shading structure held on a winding shaft. The shaft is disposed in a vehicle-fixed accommodating region with a passage, through and across which passage the shading structure is displaceable between a rest position wound up on the winding shaft and a shading position covering the window pane. The passage is capable of being closed or exposed via a pivotably mounted closing part. A drive system is provided for displacing the shading structure between the rest position and the shading position, and control kinematics are provided, coupled to the drive system, for forced control of an opening or closing movement of the closing part. The control kinematics include a cable pull arrangement provided with a cable control pulley having at least one cable deflection track eccentric in relation to a rotational axis of the cable control pulley.

9 Claims, 3 Drawing Sheets

(58) Field of Classification Search
CPC .. B60J 1/2077; B60J 1/208; B60J 3/02; E06B 9/68; E06B 9/58; E06B 2009/583
See application file for complete search history.

(56) References Cited

U.S. PATENT DOCUMENTS

| | | | |
|---|---|---|---|
| 8,074,457 B2* | 12/2011 | Bin-Nun | F25B 9/14 |
| | | | 60/516 |
| 9,387,745 B2* | 7/2016 | Na | B60J 1/2011 |
| 2006/0049021 A1* | 3/2006 | Scheib | E06B 9/68 |
| | | | 192/139 |
| 2008/0315615 A1 | 12/2008 | Lekar | |

FOREIGN PATENT DOCUMENTS

| | | | | |
|---|---|---|---|---|
| DE | 102016212165 A1 * | 1/2018 | | B60J 1/2063 |
| WO | WO-2004044362 A1 * | 5/2004 | | E06B 9/68 |

OTHER PUBLICATIONS

Search Report of European Patent Office issued in European Application No. 17 17 5560 with English translation of category of cited documents dated Dec. 1, 2017 (6 pages).

* cited by examiner

SHADING DEVICE FOR A WINDOW PANE OF AN AUTOMOTIVE VEHICLE

CROSS-REFERENCE TO RELATED APPLICATION

This claims priority from German Patent Application No. DE 10 2016 212 166.9, filed Jul. 4, 2016, the disclosure of which is hereby incorporated by reference in its entirety.

FIELD OF THE INVENTION

The invention relates to a shading device for a window pane of an automotive vehicle, comprising a flexible shading structure which is held on a winding shaft to be wound up and wound off, which shaft is disposed in a vehicle-fixed accommodating region with a passage, through and across which passage the shading structure is displaceable between a rest position wound up on the winding shaft and a shading position covering the window pane, wherein the passage is capable of being closed or exposed by means of a pivotably mounted closing part, and comprising a drive system provided for displacing the shading structure between the rest position and the shading position, and comprising control kinematics, coupled to the drive system, for forced control of an opening or closing movement of the closing part.

BACKGROUND OF THE INVENTION

Such a shading device is disclosed in DE 10 2013 006 761 A1. The known shading device is intended for a side door of a passenger vehicle and includes a flexible roller blind sheet which is held on a winding shaft to be wound up and off. The roller blind sheet is provided with a pull-out profile on an end face region that is in front in the pull-out direction, which profile is displaceable in lateral guiding rails along the side window of the side door in the vertical direction of the vehicle. In a rest position, the roller blind sheet and the pull-out profile are disposed below a door sill in a cartridge housing which is provided with a passage towards the top, in order to allow an upwards deployment of the pull-out profile and the shading structure. The passage is capable of being closed or exposed by means of a pivotable closing part. Said closing part is forcedly controlled using control kinematics between a closed position, an open position and an intermediate position, depending on an inwards or outwards move of the pull-out profile. If the pull-out profile and the shading structure are in their rest positions, the closing part is in its closed position. For deployment of the pull-out profile and the shading structure from the rest position towards the shading position, the closing part is transferred into its open position. Upon reaching the shading position of the pull-out profile and the roller blind sheet, the closing part is pivoted back to an intermediate position which corresponds to a partially opened position. Displacement of the pull-out profile and the roller blind sheet between the shading position and the rest position is effected by a drive system to which the control kinematics for displacing the closing part are coupled as well.

SUMMARY OF THE INVENTION

It is an object of the invention to provide a shading device of the above mentioned type which allows compact and functionally reliable forced control of the closing part.

The object is achieved in that the control kinematics include a cable pull arrangement, provided with a cable control pulley having at least one cable deflection track eccentric in relation to a rotational axis of the cable control pulley. Depending on the rotational position of the cable control pulley, different cable pull lengths are obtained as a result, which act on the closing part and, consequently, displace the closing part to the different pivoted positions in a simple manner. The rotational mobility of the cable control pulley allows simple coupling to a corresponding drive member of the drive system. Advantageously, the cable pull arrangement includes an open cable pull, with one end thereof engaging on the closing part and the other end thereof being held stationary, i.e. fixed to the vehicle. The shading device according to the invention is particularly advantageous for use with a side window of a passenger vehicle, in particular for a side window pane of a rear side door of the passenger vehicle. The drive system preferably has an electric drive motor to allow displacement of the shading structure via appropriate gearing mechanisms and drive transmission members. Advantageously, the shading structure is associated with a dimensionally stable pull-out profile on its end face region that is in front in the pull-out direction. The drive system is configured such that both the pull-out profile and the winding shaft are driven thereby. A circumferential groove in the cable control pulley is in particular provided as the at least one cable deflection track.

In an embodiment of the invention, the cable control pulley is a one-piece or multi-piece device. If more than one cable deflection track is provided, corresponding cable control pulley parts, each comprising one cable deflection track, can also be interconnected, in particular axially in relation to the cable control pulley. As a result, a maximum looping angle of the cable of the cable pull arrangement of 180° is obtained in the region of the at least one cable deflection track, while the cable control pulley rotates simultaneously with the essentially stationary looping and, thus, causes the variation of the effective cable length relative to the closing part.

In a further embodiment of the invention, a plurality of eccentric cable deflection tracks are provided and disposed mutually offset in the circumferential direction of the cable control pulley, and have different radial spacings relative to the rotational axis of the cable control pulley. Advantageously, the different cable deflection tracks are arranged distributed over a circumference of the cable control pulley and merge helically over a circumference of the cable control pulley in true alignment. Consequently, the different cable deflection tracks adjoin each other in true alignment in the circumferential direction. A corresponding cable branch of the cable pull, which is deflected in the region of the cable control pulley, thereby slides from one cable deflection track to the succeeding one, depending on the sense of rotation of the cable control pulley. What is substantial for the solution according to the invention is that the cable pull does not loop around the cable control pulley in a force-fitting manner, but that the cable deflection tracks of the cable control pulley, rather, slide along relative to the deflected cable branch during their rotational movement, wherein different deflection lengths of the cable branch are defined merely by the different radial spacings of the different cable deflection tracks in relation to the rotational axis of the cable control pulley. As a result, the varying cable lengths between the engagement of the cable pull on the closing part and the cable control pulley are caused, whereby the closing part performs the desired pivoting moves.

In a further embodiment of the invention, the cable pull arrangement includes a cable adjustment unit. The cable adjustment unit is to maintain a uniform cable tension of the cable pull arrangement, regardless of the length of the deflected cable branch supported on the respective cable deflection track of the cable control pulley. The cable adjustment unit comprises a deflection element for the cable pull arrangement, which deflection element is spring-loaded and movably mounted in order to allow tracking of the different looping lengths of the deflected cable branches, and in order to allow a uniform cable tension to be maintained. A sliding or rolling element can be provided as the deflection element.

In a further embodiment of the invention, the cable control pulley is driven by a drive member of the drive system. Preferably, a transmission shaft coupled to a corresponding gearing mechanism of the drive system is provided as the drive member, which is coupled directly or indirectly via a worm gear or similar device to the cable control pulley for torque transmission.

In a further embodiment of the invention, the cable pull arrangement is disposed laterally of the closing part and engages in a side area of the closing part. A particularly simple design of the cable pull arrangement is allowed thereby. In order to allow engaging of a cable end of an open cable pull on the closing part, the closing part advantageously is provided with a lever extension protruding laterally outwards, which lever is molded integrally to the closing part or fixed to the closing part with a radial spacing from a pivot axis of the closing part.

Further advantages and features of the invention will become apparent from the claims and from the description of a preferred exemplary embodiment of the invention given below, which is illustrated with reference to the drawings.

DETAILED DESCRIPTION

Figure 1:
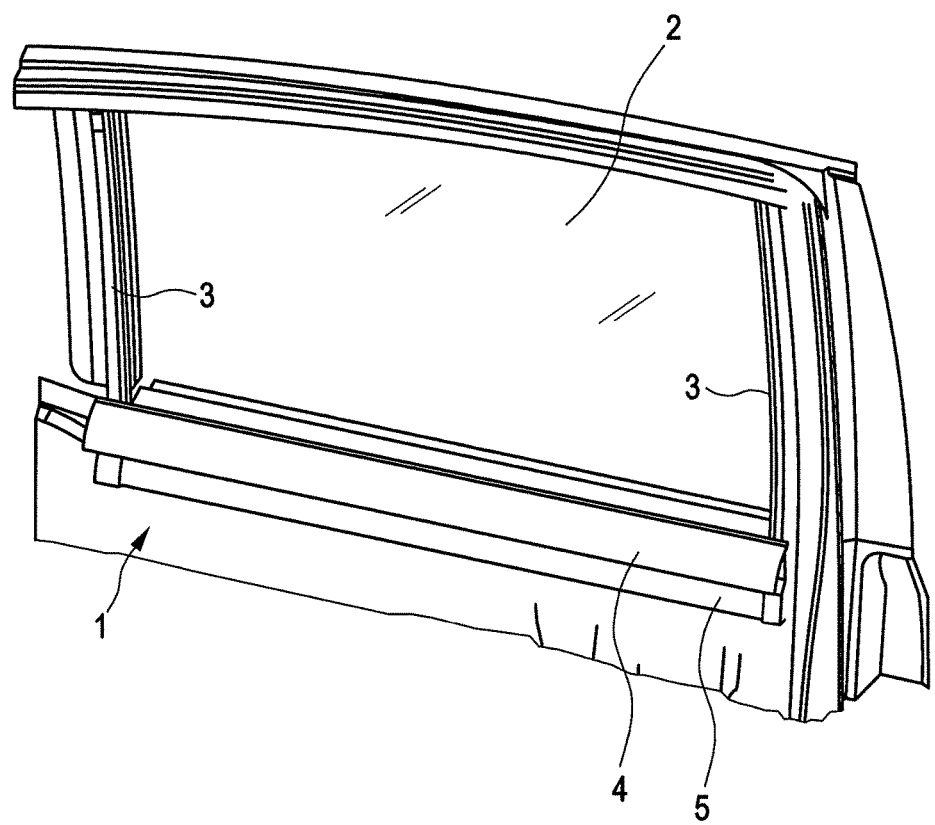
FIG. 1 shows schematically a partial region of a side door of a passenger vehicle including an embodiment of a shading device according to the invention disposed on the vehicle interior side.
Figure 2:
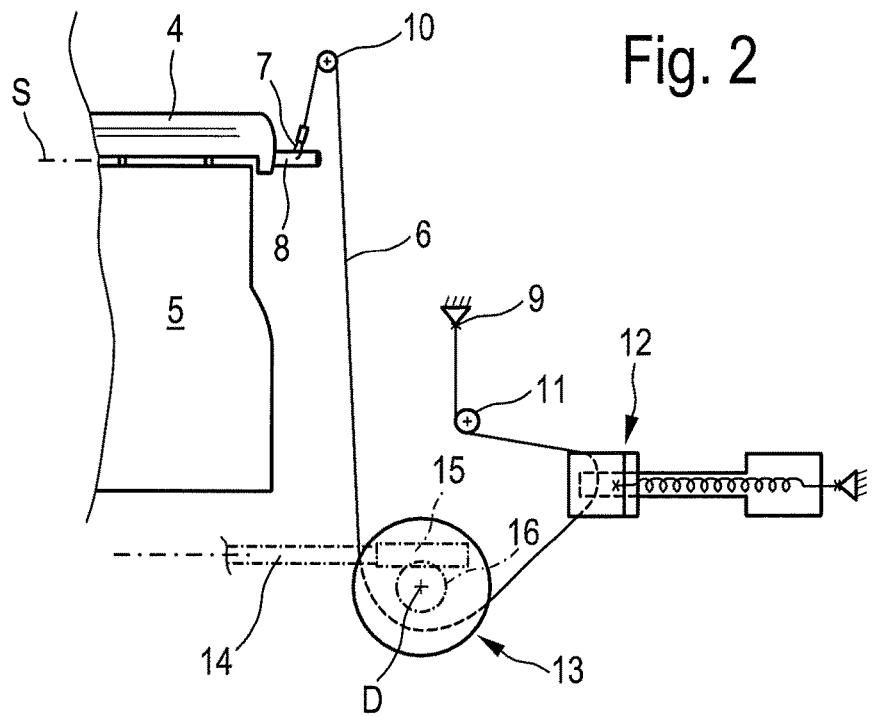
FIG. 2 shows schematically a section of the shading device according to FIG. 1 in a closed position of a closing part of the shading device.
Figure 3:
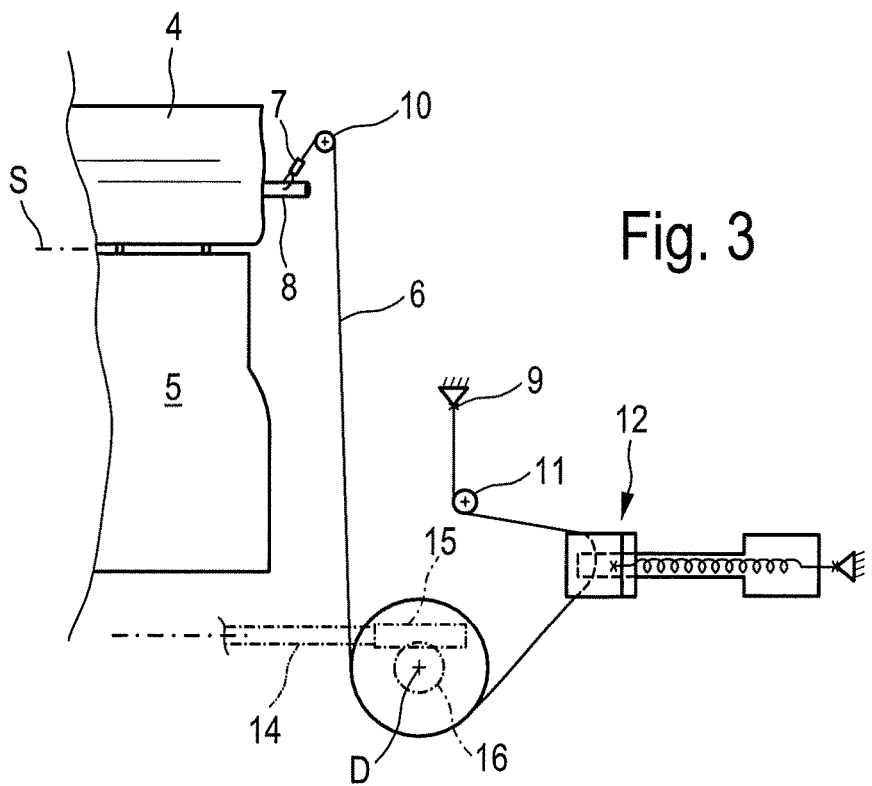
FIG. 3 shows schematically a partial region of the shading device according to FIG. 2 in an open position of the closing part.

A passenger vehicle includes a side door 1 according to FIG. 1, embodied in a rear side door. The side door 1 includes, above a door sill, a side window pane 2 bordered by corresponding door frame sections. On the door interior side, the side window pane 2 is associated with a shading device which will be described in more detail below with reference to FIGS. 2 to 5. The shading device includes a flexible shading structure composed of a textile woven or knitted fabric. The shading structure is held on a winding shaft to be wound up and wound off, which shaft is rotatably mounted in an accommodating region of a cartridge housing 5. The cartridge housing 5 is mounted fixed to the door on the vehicle interior side and extends essentially in the vehicle longitudinal direction. The shading structure has a dimensionally stable pull-out profile on its end face region that is in front in the pull-out direction, which pull-out profile is displaceable in parallel in door-fixed guiding rails 3 along the side window pane 2 essentially in the vertical direction of the vehicle. The lateral guiding rails 3 are fixed to corresponding door frame sections. The pull-out profile is connected to entrainers on its opposite face end region, which entrainers are guided in the guiding rails 3. Displacing the pull-out profile in the vertical direction of the vehicle, along the guiding rails 3 downwards or upwards, necessarily results in a corresponding displacement of the shading structure such that the shading structure can be displaced between a shading position and a rest position. In the shading position the pull-out profile is displaced along the guiding rails 3 up to an upper door frame section and the shading structure covers the side window pane 2 at least largely. In the rest position the shading structure and the pull-out profile are displaced downwards in the vertical direction of the vehicle, the shading structure is wound up on the winding shaft, and the pull-out profile is positioned in the accommodating region of the cartridge housing 5. The accommodating region of the cartridge housing 5 is open towards the top and forms a passage for the pull-out profile and the shading structure. Said passage is capable of being closed or exposed by a closing part 4 in the form of a pivotable lid. The closing part 4 is mounted to be pivotable about a pivot axis S extending essentially in the longitudinal direction of the vehicle. The closing part 4 extends over an entire length of the side window pane 2—as seen in the longitudinal direction of the vehicle—and terminates, in a closed position, at least largely flush with the door sill of the side door 1. The closing part 4 is transferable from said closed position to an open position in which the passage is completely exposed, to allow displacing of the pull-out profile and the shading structure from the rest position to the shading position. For displacing the pull-out profile and the shading structure between the rest position and the shading position, a drive system is provided and includes an electric drive motor.

The drive system includes two threaded helix cables, each installed in a respective one of the two guiding rails 3 and connected to a respective entrainer which is associated with the respective face end region of the pull-out profile. In another embodiment of the invention, the two flexible threaded helix cables can be replaced by flexible toothed racks. The drive transmission trains in the form of the threaded helix cables are driven synchronously via a synchronous shaft which is oriented coaxially or axially parallel to a rotational axis of the winding shaft. The synchronous shaft bears two rotationally fixed gear wheels, each associated with a respective one of the two drive transmission trains, in the present case the threaded helix cables. The synchronous shaft is driven via a toothed gear mechanism by a flexible drive shaft which is coupled to the motor shaft of the electric drive motor. Even the winding shaft per se is associated with a rotationally fixed gear wheel which can be driven by the gear mechanism of the drive system. Thereby, the drive system drives both the winding shaft and the threaded helix cables for the pull-out profile. In order to cause permanent and uniform tightening of the flexible shading structure in an at least partially pulled-out functional position, a spring preloading unit is interposed between the gear wheel for driving the winding shaft and the winding shaft, said spring unit holding the winding shaft under the effect of spring preloading in the winding up direction and, nonetheless, can be rotated together with the winding shaft via the drive wheel.

An opening or closing movement of the closing part 4 is derived from a drive of the drive system, in order to allow an opening or closing movement as a function of a corresponding displacement of the pull-out profile and the shading structure. For that purpose, the drive system includes a transmission shaft 14 (FIGS. 2 and 3) which is oriented coaxially or axially parallel to the synchronous shaft and connected to the synchronous shaft in a rotationally fixed manner. As an alternative, a step-up or step-down gearing mechanism can be provided between the synchronous shaft and the transmission shaft 14. Said gearing mechanism is convenient in order to make a relative long travel path for the pull-out profile between the rest position and the shading position compatible to a relatively short pivot path of the closing part 4 between the open position and the closed position.

The transmission shaft 14 drives a cable control pulley 13 of a cable pull arrangement by means of a worm drive which will be described in more detail below. The worm drive includes a worm shaft 15 coaxial to the transmission shaft 14 and fixedly connected to the transmission shaft 14, said worm shaft 15 meshing with a worm wheel 16 which is oriented coaxially to a rotational axis D of the cable control pulley 13 and connected to the cable control pulley 13 in a rotationally fixed manner. The worm wheel 16 can be molded integrally to the cable control pulley 13 or be manufactured separately and subsequently be connected to the cable control pulley 13 in a rotationally fixed manner. The cable control pulley 13 constitutes a deflection element for an open cable 6 of the cable pull arrangement. The cable control pulley 13 is positioned at a distance below the closing part 4 laterally adjacent to the cartridge housing 5. Also, the cable 6 of the cable pull arrangement extends laterally adjacent to the closing part 4 and the cartridge housing 5. The cable 6 has an upper cable end 7 which is fixedly connected to a lever extension 8 of the closing part 4, which lever extension protrudes from a lateral edge region of the closing part 4 outwards, axially parallel, but radially spaced from the pivot axis S. The lever extension 8 is fixedly connected to the closing part 4. The cable end 7 forms a loop in the vicinity of the lever extension 8 in order to achieve a fast connection between the lever extension 8 and, thus, the closing part 4 and the cable end 7. The cable 6 is led, starting from the cable end 7, upwards and over a deflection pulley 10 downwards. The cable 6 is led downwards essentially in the vertical direction of the vehicle towards the cable control pulley 13 on which the cable 6 is deflected on a respective eccentric cable deflection track 13a, 13b, 13c in an angle between 90° and 180°. After the cable control pulley 13, the cable 6 is deflected on a cable adjustment unit 12 and on another deflection pulley 11 towards a door-fixed articulation point 9, where the cable end opposite to the cable end 7 is attached. The cable adjustment unit 12 constitutes a deflection element which is spring-elastic and resiliently movable transversely to the cable routing. Thereby, firstly a uniform cable tension of the cable 6 is achievable. Secondly, owing to the cable adjustment unit 12, there is cable length adjustment depending on the condition on which of the three cable deflection tracks 13a, 13b, 13c the cable 6 is deflected in the region of the cable control pulley. The cable control pulley 13 is mounted for rotation about the rotational axis D and is driven via the worm drive and the transmission shaft 14 by outputting the driving force of the electric drive motor. The two deflection pulleys 10 and 11 are mounted fixed to the door, but capable of rotating. The cable deflection tracks 13a, 13b, 13c represent different open and closed positions of the closing part 4. In the vicinity of the respective cable deflection track 13a, 13b, 13c, the cable 6 is respectively deflected merely by an angle of less than 180° about the cable control pulley 13. Depending on the condition, in which of the cable deflection tracks 13a, 13b, 13c the cable 6 is deflected, a longer or shorter cable path about the cable control pulley 13 is obtained. Thereby, the free cable length of the cable 6 between the stationary deflection pulley 10 and the cable control pulley 13 is varied, and as a result, the lever extension 8 has to be trailed necessarily. Consequently, a corresponding opening or closing movement of the closing part 4 is forcedly controlled thereby.

Figure 4:
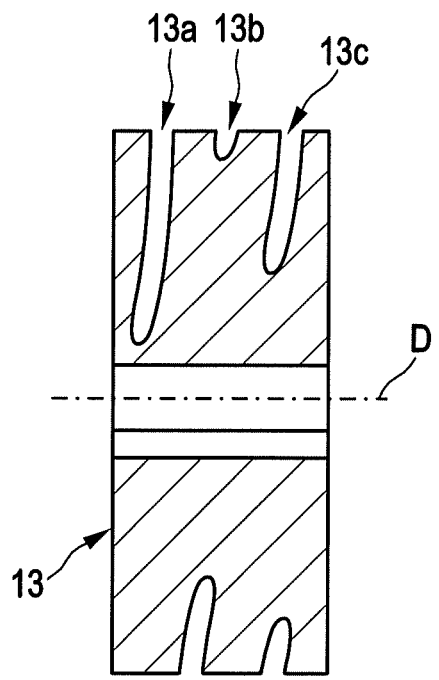
FIG. 4 shows a longitudinal sectional view of a cable control pulley of the shading device according to FIGS. 2 and 3.

With reference to FIG. 4, it is apparent that the three cable deflection tracks 13a, 13b, 13c merge in true alignment in a spiral shape from the exterior periphery of the cable control pulley 13. The spiral-shaped winding of the cable deflection tracks 13a, 13b, 13c adjoining in the circumferential direction is illustrated with reference to FIG. 5. However, the indicated cable 6 is not looped around each and all of the cable deflection tracks 13a to 13c, as could be supposed from the illustration of FIG. 5. Rather, the cable 6 is in each case merely led around one of the three cable deflection tracks 13a, 13b, 13c. By a corresponding turning of the cable control pulley 13, the deflected cable branch of the cable 6 is displaced into the respective adjoining spiral-shaped cable deflection track, whereby the remaining cable branch length between the cable end 7 and the cable control pulley 13 is necessarily varied. The cable deflection tracks 13a, 13b, 13c each have a different radial spacing from the rotational axis D, whereby a longer or shorter cable deflection path for the cable 6 results in the respective cable deflection track. As a result, there is a varying cable branch length between the cable end 7 and the intake of the cable 6 into the cable control pulley 13 and, consequently, a desired pivoting of the closing part 4. With reference to FIG. 4, it is apparent that the cable deflection tracks 13a, 13b, 13c are introduced into the exterior periphery of the cable control pulley 13 in a groove shape from the exterior, wherein the cable deflection tracks 13a, 13b, 13c merge in true alignment in a spiral shape, as seen over the circumference of the cable control pulley 13. What is obtained for the cable deflection track 13a is a deep groove-shaped slot, for the cable deflection track 13b a very flat groove slot and for the cable deflection track 13c a medium groove slot. The deflected cable branch of the cable 6 in each case penetrates down to the bottom of the groove-shaped slot of the respective cable deflection track 13a, 13b, 13c, since the cable 6 is held under permanent tension via the cable adjustment unit 12.

Figure 5:
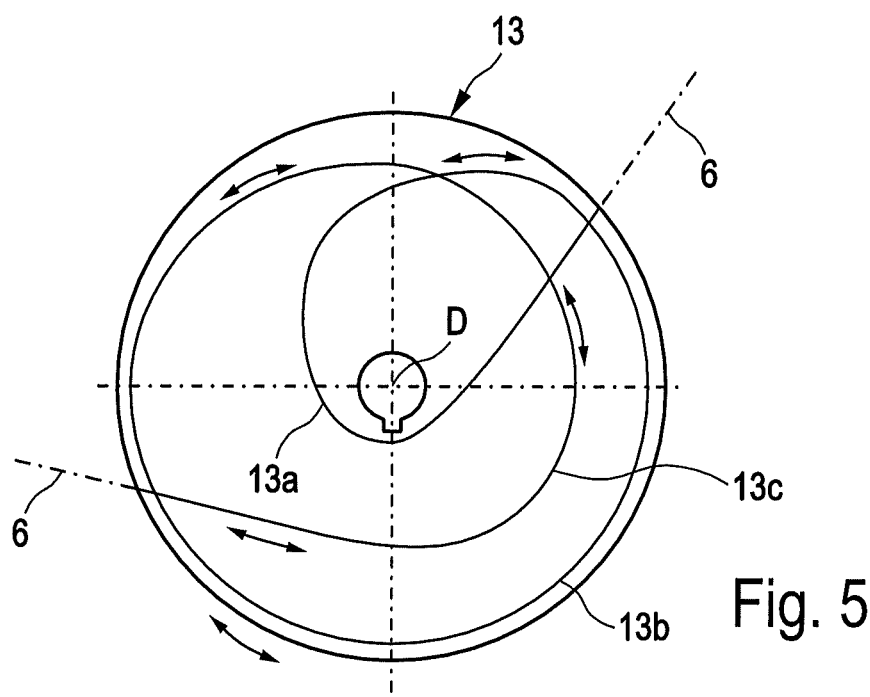
FIG. 5 shows a schematic front view of the cable control pulley according to FIG. 4 with different cable deflection tracks.

Accordingly, during operation of the cable pull arrangement 6, when the closing part is in its closed position, the cable 6 is installed in that cable deflection track 13a where the cable branch length of the cable 6 towards the deflection pulley 10 and towards the cable end 7 is greatest. Upon moving the pull-out profile and the shading structure out of the rest position, the cable control pulley 13 is turned, whereby the deflected cable branch of the cable 6 slides into the adjoining cable deflection track 13b. Said track has a flat design, whereby a radial spacing from the rotational axis D in relation to the cable deflection track 13a is increased such that the deflected cable branch has a greater length which results, necessarily, in a reduced cable branch length between cable branch pulley and closing part and to opening of the closing part 4 up to the completely open position. Once the pull-out profile and the shading structure have reached their shading position, due to the rotational move of the cable control pulley 13 the deflected cable branch, necessarily, slides into the cable deflection track 13c with a reduced radial spacing from the rotational axis D, whereby the closing part 4 is again partially closed and is transferred to an intermediate position. In said intermediate position the closing part 4 clings to the pulled-out shading structure and, consequently, is returned towards the direction of the closed position. The partial open position, corresponding to the intermediate position, is located between the closed position and the open position of the closing part 4. With reference to FIG. 5, it is apparent that starting from the cable 6 progressing from the right-hand side in the drawing layer, the cable 6 is deflected in the region of the cable deflection track 13*a* relatively close to the rotational axis D, whereby the completely closed position of the closing part 4 is defined. Following said line in FIG. 5 in the clock-wise direction, it is apparent that the cable deflection track 13*a* in relation to the rotational axis D leads further radially outwards in the circumferential direction up to close to the edge of the exterior periphery of the cable control pulley 13 into the cable deflection track 13*b*. The cable deflection track 13*b* remains in said approximately maximum distance to the rotational axis D over almost a complete revolution of the cable control pulley 13. Over said path and within said period of time the pull-out profile is displaced upwards up to the shading position. At the transition of the cable deflection track 13*b* (in FIG. 5 further following the line in the clock-wise direction) the line merges in the cable deflection track 13*c* which forms a reduced radial spacing from the rotational axis D over a range of a circular arc. In said range the closing part 4 is returned in the closing direction up to the intermediate position. Upon reaching the intermediate position, the drive system can be shut-off. When the shading structure and the pull-out profile are again to be transferred from the shading position back to the rest position, the cable control pulley 13 is driven via the worm drive and the transmission shaft 14 in a correspondingly reversed direction, whereby the closing part 4 is transferred from the intermediate position back to the completely open position, until the pull-out profile is retracted into the passage of the cartridge housing 5. Then, the closing part 4 is necessarily transferred to its closed position. During a return move of the shading structure and the pull-out profile, sliding of the deflected cable branch is correspondingly reversed counter-clockwise, according to the illustration in FIG. 5.

The invention claimed is:

1. A shading device for a window pane of an automotive vehicle, the shading device comprising a flexible shading structure and a winding shaft, the flexible shading structure being displaceable between a rest position in which the flexible shading structure is wound up on the winding shaft and a shading position in which the flexible shading structure is wound off of the winding shaft and oriented in a window pane-covering configuration, the shading device further comprising a closing part mounted for pivoting movement to close off or expose a passage through which the flexible shading structure is displaceable during movement between the rest and the shading positions thereof, a drive system provided for displacing the flexible shading structure between the rest position and the shading position, and control kinematics coupled to the drive system for forced control of an opening or closing movement of the closing part, the control kinematics including a cable pull arrangement with a cable control pulley having at least one cable deflection track oriented eccentrically in relation to a rotational axis of the cable control pulley.

2. The shading device according to claim 1, wherein the cable control pulley is a one-piece or a multi-piece device.

3. The shading device according to claim 1, further including a plurality of eccentric cable deflection tracks disposed offset in relation to each other in a circumferential direction of the cable control pulley, the eccentric cable deflection tracks having different radial spacings relative to the rotational axis of the cable control pulley.

4. The shading device according to claim 3, wherein the eccentric cable deflection tracks are arranged in a helical distribution over a circumference of the cable control pulley and merge in true alignment.

5. The shading device according to claim 1, wherein the cable pull arrangement includes a cable adjustment unit.

6. The shading device according to claim 1, wherein the cable control pulley is driven by a drive member of the drive system.

7. The shading device according to claim 1, wherein the cable pull arrangement is disposed laterally of the closing part and engages with the closing part at a side area thereof.

8. The shading device according to claim 1, further including a vehicle-fixed accommodating region in which the winding shaft is disposed.

9. The shading device according to claim 8, further including a housing, the housing comprising the vehicle-fixed accommodating region and the passage through which the shading structure is displaceable.

\* \* \* \* \*